(12) United States Patent
Ladki et al.

(10) Patent No.: US 9,378,011 B2
(45) Date of Patent: Jun. 28, 2016

(54) NETWORK APPLICATION VERSIONING

(75) Inventors: Saad Ladki, Bellevue, WA (US); Vijay Sen, Redmond, WA (US); Clea Allington, Bellevue, WA (US); William J. Staples, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1527 days.

(21) Appl. No.: 12/406,972

(22) Filed: Mar. 19, 2009

(65) Prior Publication Data

US 2010/0242032 A1 Sep. 23, 2010

(51) Int. Cl.
G06F 9/44 (2006.01)
G06F 11/14 (2006.01)

(52) U.S. Cl.
CPC .............. *G06F 8/71* (2013.01); *G06F 11/1433* (2013.01); *G06F 11/1446* (2013.01)

(58) Field of Classification Search
CPC .... G06F 8/71; G06F 11/1433; G06F 11/1446
USPC ......................................................... 717/171
See application file for complete search history.

(56) References Cited

U.S. PATENT DOCUMENTS

| | | |
|---|---|---|
| 7,020,697 B1 | 3/2006 | Goodman et al. |
| 7,099,899 B2 * | 8/2006 | Choy ................. G06F 17/30309 |
| 8,006,116 B1 * | 8/2011 | Sobel ..................... G06F 11/076 |
| | | 711/162 |
| 2003/0055919 A1 | 3/2003 | Fong et al. |
| 2003/0167421 A1 * | 9/2003 | Klemm ............... G06F 11/1438 |
| | | 714/37 |
| 2005/0080801 A1 | 4/2005 | Kothandaraman et al. |
| 2008/0313496 A1 * | 12/2008 | Prabhakaran ....... G06F 11/1402 |
| | | 714/15 |
| 2009/0013267 A1 | 1/2009 | Cudich et al. |
| 2009/0041230 A1 * | 2/2009 | Williams ............ G06F 11/1464 |
| | | 380/28 |
| 2009/0119657 A1 * | 5/2009 | Link, II ......................... 717/171 |
| 2009/0217255 A1 * | 8/2009 | Troan ............................ 717/168 |
| 2010/0125841 A1 * | 5/2010 | Bauer ................. G06F 11/1433 |
| | | 717/174 |

OTHER PUBLICATIONS

"IDrive Online Backup Classic", Retrieved at<< http://www.idrive.com/online-backup-features.htm>>, Jan. 23, 2009, pp. 2.

"Loudcloud takes the Pain out of Change Management with Automated Code Deployment System 2.0; Industry's only Automated Code Deployment System Increases Security, Adds Integration with myLoudcloud Customer Portal and On-Demand Back Up and Restore", Retrieved at<<http://findarticles.com/p/articles/mi_m0EIN/is_2002_Jan_14/ai_81773139>>, Jan. 23, 2009, pp. 4.

(Continued)

*Primary Examiner* — Idriss N Alrobaye
*Assistant Examiner* — Brooke Taylor
(74) *Attorney, Agent, or Firm* — Kevin Sullivan; Kate Drakos; Micky Minhas

(57) ABSTRACT

A system and method for managing application version changes on a network server. A backup is made of a deployed application version. When an update version of the application is to be deployed, a backup of the current application, including dynamic data, is performed. The update version is deployed and automatically monitored. If the update version is determined to be healthy, it is backed up. If it is determined to not be healthy, the previous version is automatically retrieved and deployed. An application skeleton may be automatically generated to facilitate comparison and backups of the application.

20 Claims, 4 Drawing Sheets

(56) References Cited

OTHER PUBLICATIONS

"Packaging/Deployment", Retrieved at<<http://www.caucho.com/resin/doc/webapp-deploy.xtp>>, Jan. 23, 2009, pp. 3.

"Introducing Client Application Deployment with "ClickOnce"", Retrieved at<<http://msdn.microsoft.com/en-us/library/ms996413.aspx>>, Oct. 2003, pp. 15.

"The Common Language Runtime and Framework Class Library", Published: Nov. 2005, pp. 36.

\* cited by examiner

NETWORK APPLICATION VERSIONING

TECHNICAL FIELD

The present invention relates generally to computer systems, and, more particularly, to managing deployment of network applications.

BACKGROUND

A network server, such as a Web server, typically includes one or more network applications that provide services to remote users by way of a request and response mechanism. The requests may include requests for web pages, files, or various data. They may also include requests to store data, process data, facilitate e-commerce, or provide various other services. A network server may provide many of the functions required to implement a Web site or network service.

A network application may go through numerous versions in its lifetime. Typically, one or more developers create an update version of an application and the application is tested. If the application passes testing, it may then be installed on a network server. Installing an application may be a complex process, due to the many components and types of components that may be involved. In addition to code files, installing an application may include installing certificates, creating or changing system registry entries, and configuring a database, as well as installing or changing other content.

In some situations, a problem with a network application may not be discovered until after it is installed and begins running "live." This may be due to inadequate testing, interaction with other components or a different configuration in the network server, or for other reasons. In some situations, an administrator may not become aware of the problem until after a lengthy period of time. The administrator may then attempt to restore the application by using backup files, manually changing some components or data, or other actions. In some situations, the problem version may have caused changes that are difficult to determine.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to manage application version changes on a network server. The system performs a backup of a first version of a network application. In response to receiving an update version of the application, the system automatically performs a backup of the current network application, including dynamic data that may have changed since the prior backup, and automatically deploys the update version. After deploying the update version, a monitoring component automatically monitors the application to determine whether the application is healthy. If it is, the application is backed up. If it is not healthy, the previous version backup is retrieved and deployed. An application skeleton may be automatically generated to facilitate comparison and backups of the application.

In one aspect of the system, generating the skeleton includes determining a set of components of the network application, and the backup of the first version, as well as other versions, of the network application, is performed based on the determined set of components. The set of components may include static content and dynamic content, both of which may be backed up.

In one aspect of the system, generating the skeleton includes analyzing the network application to determine a set of dynamic components. This may be performed by extracting one or more database access commands, data fields, or other data references from the application. In one aspect of the system, the skeleton may be supplemented based on one or more update versions of the application.

In one aspect of the system, a user may provide a compare module that is used to perform comparisons of an application version with another version of the application. The user-defined compare module may specify a granularity of an application component and perform a comparison based on the granularity specification. A backup may be based on the granularity specification.

In one aspect of the system, a monitoring component monitors communications of the application and determines whether the application responses and actions are compliant with one or more specified criteria. The criteria may indicate an acceptable number of error messages of specified types, an acceptable time to respond, or other criteria. In one aspect of the system, a monitoring component performs active probing of the network application by sending one or more network requests, and monitors the application responses and actions. A user-defined monitor may be used to perform all or some of the actions of the monitoring component.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
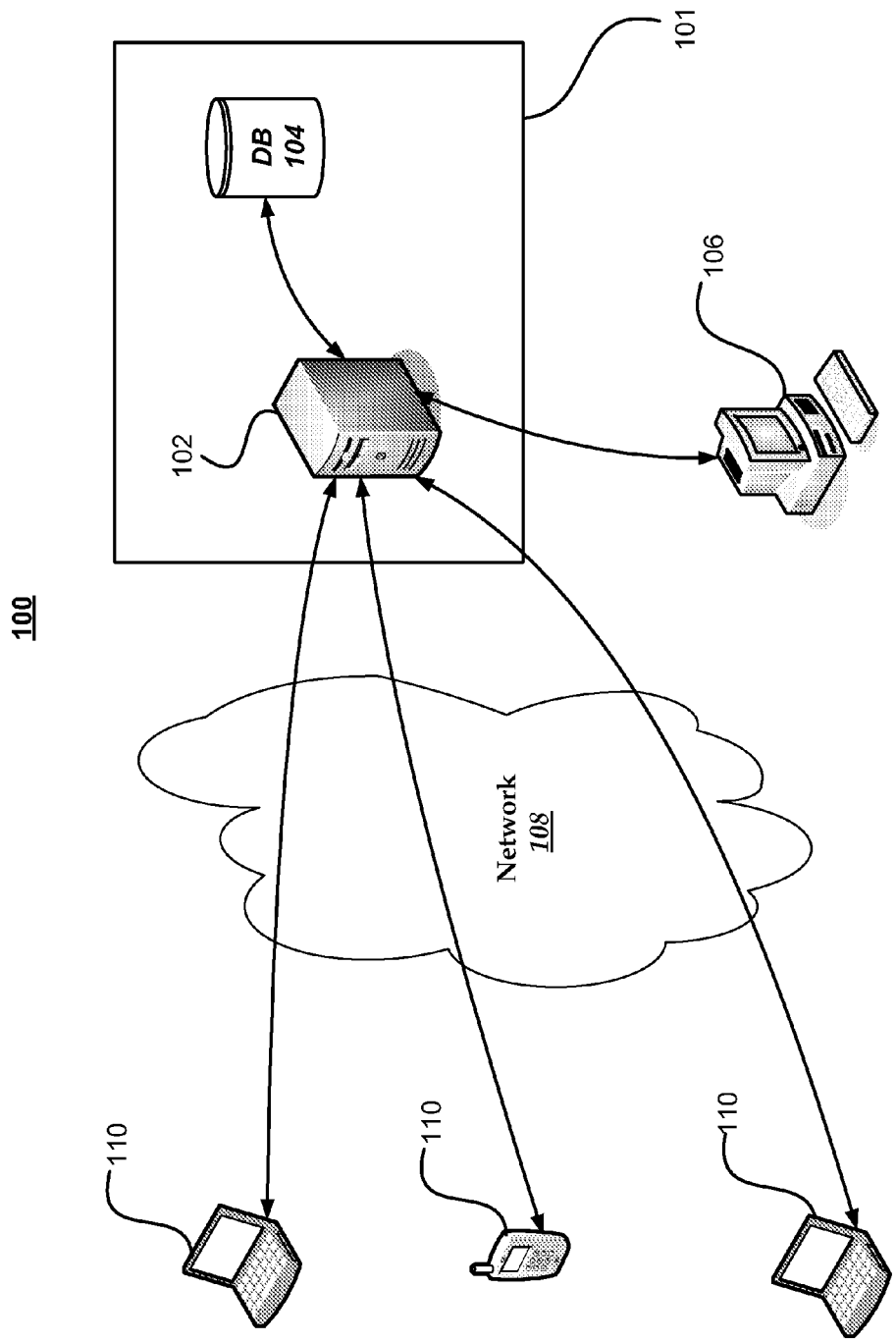
FIG. 1 is a block diagram of an environment in which the mechanisms herein described may be employed.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "user-defined" component refers to a component that is provided, configured, or developed by an application or system developer, administrator, content provider, or other entity to supplement the system. A user-defined component may supplement or replace a corresponding component of the system.

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Computer components may be stored, for example, on computer-readable media including, but not limited to, an application specific integrated circuit (ASIC), compact disk (CD), digital versatile disk (DVD), read only memory (ROM), floppy disk, hard disk, electrically erasable programmable read only memory (EEPROM), flash memory, or a memory stick in accordance with embodiments of the present invention.

FIG. 1 is a block diagram of a computer network environment 100 in which mechanisms described herein may be implemented. FIG. 1 is only an example of a suitable environment and is not intended to suggest any limitation as to the scope of use or functionality of the present invention. Thus, a variety of system configurations may be employed without departing from the scope or spirit of the present invention.

As illustrated, environment 100 includes data center 101, which itself includes server 102 and database 104. Data center 101 may include one or more servers that may be collocated or geographically distributed, though only one network server 102 is illustrated. Server 102 is a computing device having one or more processing units and associated components. Server 102 may include applications that provide services to remote clients or other servers.

As illustrated, data center 101 includes database 104. Database 104 may be used to store and retrieve data used by server 102. The data may include data pertaining to remote users, such as customer information. It may include data pertaining to a web site, business, or other entity. For example, database 104 may include a product catalog, a catalog of courses, maps, or any other data to be stored or accessed by data center 101. Database 104 may reside on a single computing device or be distributed among multiple computing devices.

Data center 101 may include additional computing devices, such as data storage devices, switches, routers, firewalls, or the like. Multiple servers 102 may be in direct or indirect communication with each other. Each server 102 may have a corresponding database 104, or multiple servers may share database 104.

As illustrated, network environment 100 includes development device 106. Development device 106 may be used by an application developer, web site developer, administrator, content provider, or other user who provides or maintains content such as applications or data for use by server 102. In various configurations, development device 106 may be located within data center 101 or it may be external to it. Development device 106 may communicate directly or indirectly with server 102 via a direct connection, a local area network, a wide area network such as network 108, a manual transfer of computer-readable media, or any other communications mechanism.

Server 102 may communicate with remote devices by way of a network 108. Network 108 may include a local area network, a wide area network, or a combination thereof. In one embodiment, network 108 includes the Internet, which is a network of networks. Network 108 may include wired communication mechanisms, wireless communication mechanisms, or a combination thereof. Communications between server 102 and any other computing devices may employ one or more of various wired or wireless communication protocols, such as IP, TCP/IP, UDP, HTTP, SSL, TLS, FTP, SMTP, WAP, Bluetooth, WLAN, or the like.

Environment 100 may include any number of client devices 110 that communicate with server 102. Client device 110 may be any computing device, including another network server that communicates with server 102. Server 102 may provide services to client devices 110. Services may include actions such as returning a web page or file, setting up an account, or access to various data.

Figure 2:
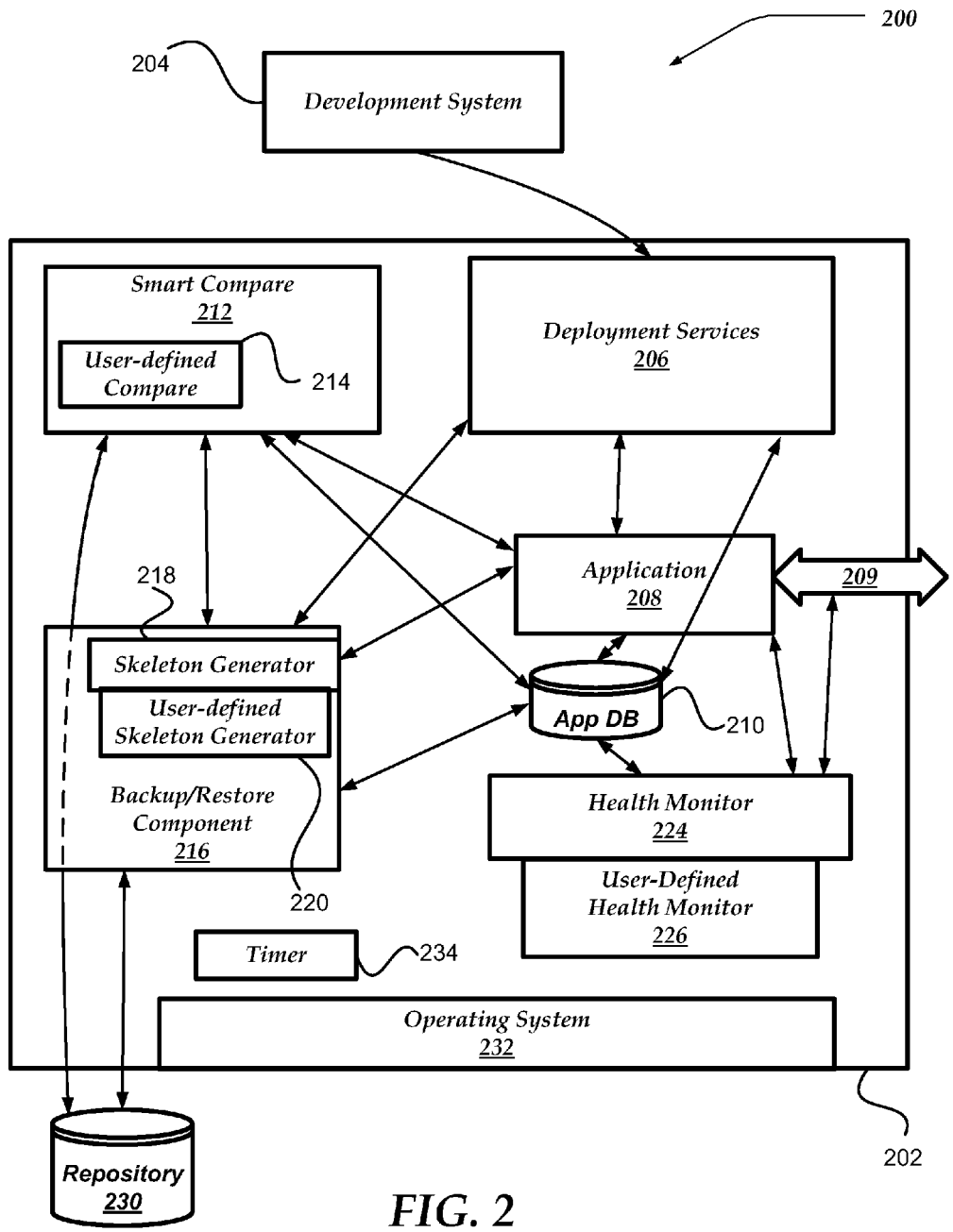
FIG. 2 is a block diagram of a computer system that may employ the mechanisms herein described.

FIG. 2 illustrates a computing system 200 that may be employed with the mechanisms described herein. Computing system 200 includes a server 202, which may be server 102 of FIG. 1. Server 202 may be a web server, application server, or other server that provides services to remote users. Server 202 may refer to software that executes on one or more computing devices, electronic components that include program logic, a computing device, or a combination thereof. A computing device may be a special purpose or general purpose computing device. In brief, one embodiment of a computing device that may be employed includes one or more processing units, a mass memory, and a communications interface. Example computing devices include mainframes, servers, blade servers, personal computers, portable computers, communication devices, consumer electronics, or the like.

As illustrated, computing system 200 includes development system 204. Development system 204 may include one or more development devices, such as development device 106 of FIG. 1. In some configurations, development system 204 may include a test server, staging server, source code repository, or various development tools.

As illustrated, server 202 communicates with application database 210. Application database 210 may be integrated with server 202, reside on the same computing device, or it may reside on one or more separate computing devices. Application database 210 may be shared by multiple servers 202. Application database 210 may include data storage media, user data, and program logic for accessing data. Application database 210 may include a structured database or unstructured data such as a file.

As illustrated, server 202 includes several components. Briefly, operating system 232 may be any general or special purpose operating system. The Windows® family of operating systems, by Microsoft Corporation, of Redmond, Wash., are examples of operating systems that may execute on server 202.

As illustrated, server 202 further includes one or more applications 208. Applications 208 may include one or more programs or program components that provide one or more of a variety of services as discussed herein, such as Internet or application services. As illustrated by arrow 209, application 208 may communicate, directly or indirectly, with remote devices, such as remote devices 110 of FIG. 1, via a network, such as network 108. Though not illustrated, server 102 may include one or more protocol modules that facilitate communicating with one or more communication protocols, such as HTTP, FTP, SMTP, WAP, or the like.

As illustrated, server 202 includes deployment services component 206. Deployment services component 206 may receive a version of an application or application components, and deploy it onto server 202. As used herein, the term "application" refers to a computer program or a computer program and associated data. An application is made up of any combination of application components, which may include program instructions, data, text, object code, images or other media, security certificates, scripts, or other software components that may be installed on a computing device to enable the device to perform desired functions. Application components may exist in the form of files, libraries, pages, binary blocks, or streams of data. Application components may be distributed in various locations, and may be integrated with components of other applications or of the computer system. Examples of application components include object files, libraries, COM objects, code assemblies, global assembly cache components, markup language pages or templates, system registry entries, entries in configuration or system files, or the like. Components of an application are also referred to as application "content." Application content may be static or dynamic. Generally, static content is content that may be changed by deployment of new versions of the content or by configuration of the application. Dynamic content refers to content that is changed during execution of the application. Some dynamic content may be changed by deployment of a new version of the content as well as by execution of the application.

Examples of applications include an application that implements a web site by providing web pages, scripts, media, or data. Other examples of applications include search engines, mapping programs, mail programs, e-commerce applications, or the like. Deploying an application may include creating directory structures, copying one or more files into the correct locations, entering or modifying data in a system registry or database, modifying the contents of one or more files, executing scripts, or other actions to facilitate execution of the application.

Deployment services component 202 may also receive a version of an application from backup/restore component 216 and use the received version to revert an application to a previous state. This may occur, for example, if a problem is discovered with an executing application. Deployment services component 206 may retrieve a prior version of the application and restore the application to the prior version. This process is discussed in further detail herein.

Backup/restore component 216 may be used to back up versions of applications 208. As illustrated, backup/restore component 216 includes skeleton generator 218. In one implementation, skeleton generator 218 may examine application 208, including all of its component parts, and generate a skeleton of the various subcomponents. A skeleton is a set of data that identifies the components of an application. The skeleton may include a list of files or data together with the corresponding location or access mechanism for each subcomponent. For example, a file may have a corresponding path to access the file. A registry key may have a key name that identifies a data value and is used to access the data value. Identifying data may include a universal resource identifier, a data access command, or other type of identifier. Skeleton generator 218 may retrieve data to generate the skeleton from multiple sources. The skeleton generator may retrieve data that is sent from the development system 204 to deployment services component 206, the data indicating application components. In one implementation, skeleton generator 218 may analyze program code that is sent with an application version to extract references to data, such as registry keys, database fields, configuration file entries, or the like. A database access command, such as a connection string, may be extracted, indicating data referenced by the application, where the data is located, or mechanisms for accessing the data. Program code may include static declarations that indicate data references. Program code may also include references to data objects that are not included in static declarations. Any one or combination of these may be retrieved by the skeleton generator 218 to generate a skeleton.

After generating an initial skeleton, in response to receipt of a subsequent application version by deployment services component 206, skeleton generator 218 may perform additional analysis such as described above to determine additional items to supplement the skeleton. In one configuration, a user-defined skeleton generator 220 may be used in conjunction with, or instead of, skeleton generator 218 to perform the actions of skeleton generator 218, or a portion thereof. User-defined skeleton generator 220 may include logic to customize the actions of generating a skeleton for application 208. This may include logic to identify or locate type definitions, data structures, data access commands, data fields, or the like.

In one implementation, backup/restore component 216 may use a skeleton generated by skeleton generator 218 to identify and retrieve the subcomponents of applications 208. The subcomponents may be stored in repository 230. Repository 230 may store one or more versions of each subcomponent or the application in its entirety in any of a variety of ways. For example, an incremental backup may include changes since a previous backup, while a complete backup may include the entire application. Though skeleton generator 218 is illustrated as a component of backup/restore component 216, in some configurations, it may be a separate component. Repository 230 may reside on one or more computing devices distinct from server 202. In one configuration, repository 230, or a portion thereof, may reside on server 202.

As illustrated, server 202 may include smart compare module 212. Smart compare module 212 may be used to perform a comparison between two different versions or states of an application, generating data describing the differences. The smart compare module 212 may be configured by specifying a granularity to use when performing a comparison. For example, in one configuration, the difference data may indicate files that are different in the compared versions. In another configuration, the difference data may indicate specific lines or words of a file that are different, or it may include the differences. In one implementation, the difference data may include data that is sufficient to transform one of the compared versions to be equivalent to the other compared version.

In one implementation, smart compare module 212 may include logic that indicates the files or data to examine for differences. It may also include logic or data that facilitates accessing the application. For example, the smart compare module 212 may include logic to examine certain registry keys, database fields, a database schema, certificates, or various other components of applications 208. The examined content may include static content or dynamic content such as database entries. In one implementation, smart compare module 212 may include one or more user-defined compare modules 214 with additional logic corresponding to one or more of applications 208. In one implementation, a developer or administrator of applications 208 may provide user-defined compare module 214 to facilitate the operation of smart compare module 212. A user-defined compare module 214 may include program logic that identifies one or more structures, type definitions, or properties of a file, data field, or other application component. This logic may be used to perform a comparison based on knowledge of the specific content. For example, the program logic may identify content as including a string that is case-insensitive, enabling a case-insensitive comparison to be performed. The user-defined compare module 214 may also include logic to specify a granularity to use when performing comparisons. The user-defined compare module 214 may include program logic to perform a comparison, or instructions to enable the smart compare module 212 to perform a comparison. In some implementations, the smart compare module 212 may perform a byte-level comparison of a file's contents or metadata, without employing specific knowledge of the file type or structure.

In one implementation, backup/restore component 216 may use the comparison data generated by smart compare module 212 to perform an incremental backup of application 208. Based on a configuration, an incremental backup may include files that are changed or data within files that are changed. In one configuration, backup/restore component 216 may perform a complete backup of application 208, including portions that have not changed.

As illustrated, server 202 may include health monitor 224. Health monitor 224 may automatically perform various actions to determine whether an application is "healthy." The actions and criteria for determining an application's health may be implemented in a variety of ways. For example, in one configuration, health monitor 224 may monitor communications between application 208 or server 202 and a remote device and determine whether the communications or results are compliant with specified criteria. Monitoring may include examining whether responses by application 208 or server 202 are successful or not, as well as the type of error messages returned. Some errors may indicate that the application is not properly functioning due to program or data errors. Some errors may indicate that the application is properly functioning. A configuration may specify an acceptable rate of errors for various types of errors. A configuration may also specify an amount of time or a number of transactions to monitor. For example, one configuration may specify that two or more high priority errors occurring within the first 100 transactions is considered unhealthy, and that 100 transactions with less than two such errors is considered healthy. One type of health criteria may specify an acceptable response time, based on an average, a maximum, or other statistical analysis. Health monitor 224 may be configured with one or more criteria for determining health.

In one implementation, health monitor 224 may be configured to actively probe server 202 or application 208. For example, health monitor 224 may send specified types of requests or messages to server 202, and examine the responses as described above. A configuration may include data indicating responses that are expected based on specified data. For example, in one configuration, health monitor 224 may send a request for data and verify that the expected data is received, or is received within a specified period of time. In another example, health monitor may perform a login of the application and expect a successful response within a specified response time. In one configuration, health monitor 224 may be configured with specifications of responses that may be inconsistent, indicating that the application is not healthy. In one implementation, health monitor 224 may directly or indirectly query the application database to examine and analyze data. For example, after the application receives N requests to create new records, and the application has returned N success status values, health monitor 224 may query the application database to determine whether there are N new records or to otherwise verify that the requests have been handled properly.

In one configuration, one or more user-defined health monitors 226 may be integrated or employed with health monitor 224. User-defined health monitor 226 may include logic that is specifically designed to monitor one or more applications 208. User-defined health monitor 226 may be provided by a developer or administrator of applications 208. User-defined health monitor 226 may employ any of the monitoring techniques discussed with respect to health monitor 224, or other techniques. Typically, user-defined health monitor 224 includes logic that is customized to the application, and may perform more application-specific monitoring. In one configuration, a user-defined health monitor 224 may be deployed as a component of application 208 and may be updated along with application revisions. Health monitor 224 may include an API that enables a user-defined health monitor 226 to perform monitoring functions and report results to health monitor 224.

In one implementation, in response to an application 208 being updated by the deployment of an update version, health monitor 226 may automatically monitor the executing application. If the application is determined to be unhealthy, backup/restore component may automatically restore a previous version of the application. Further details of the operation of the components of FIG. 2 are described in FIG. 3 and elsewhere herein.

Figure 3:
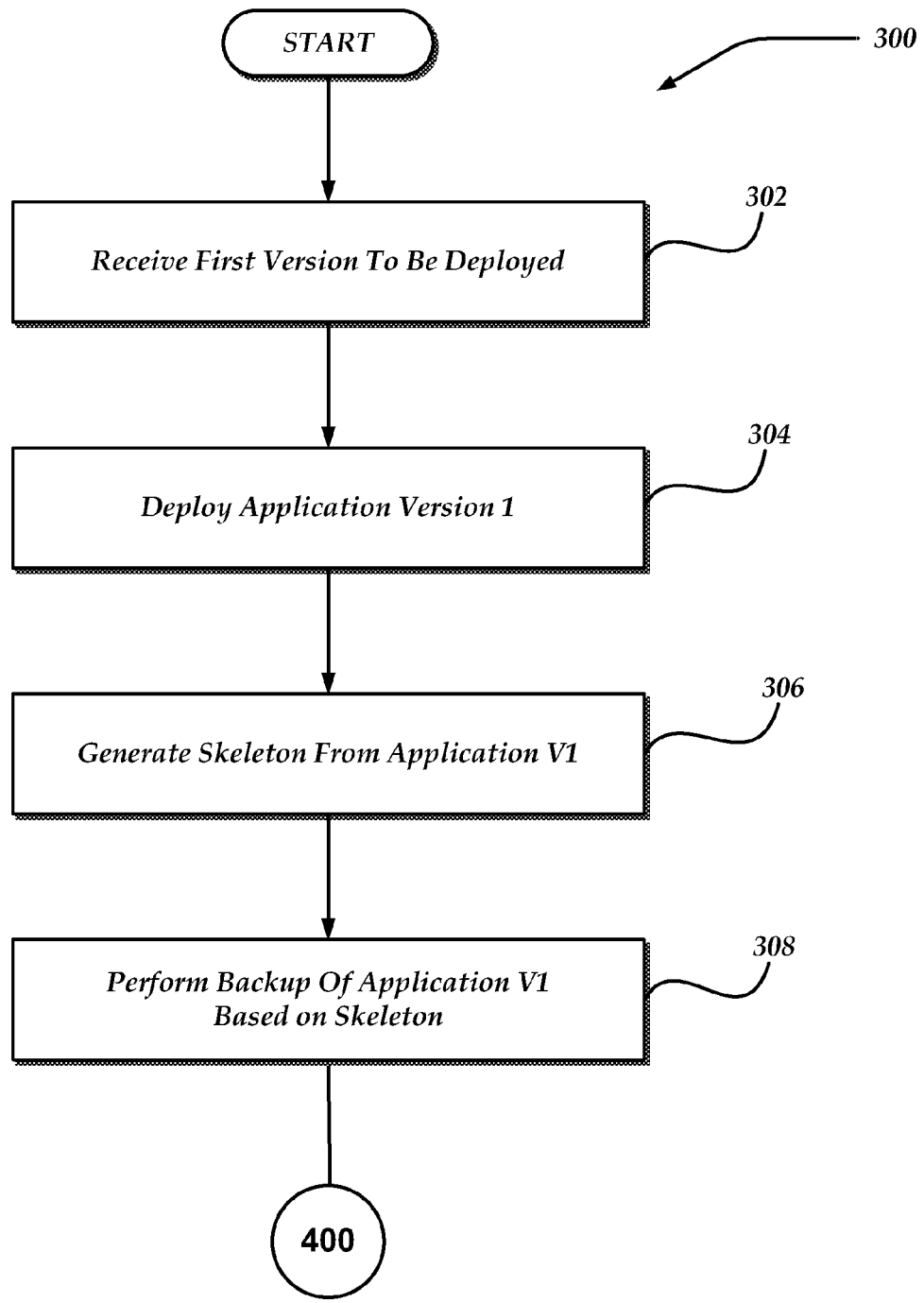
FIG. 3 is a flow diagram illustrating a process for deploying a network application, in accordance with an embodiment of the mechanisms described herein.

In one implementation, deployment services 206 may perform actions to initiate, control, or synchronize the actions of the various components of FIG. 2, or the actions of process 300 of FIG. 3, or a portion thereof. In some implementations, another component may perform control actions, or each component may initiate actions in direct response to another component. As used herein, description of performing an action "in response" to a triggering event includes such action regardless of the controlling component.

FIG. 2 also illustrates timer 234. In one implementation, timer 234 may be used to trigger a backup of a current application version at a specified time interval.

As illustrated in FIG. 2, the various components discussed herein reside on server 202. In various configurations, one or more of these components may reside on a separate computing device or be combined, divided, duplicated, or otherwise distributed among multiple computing devices.

FIG. 3 is a flow diagram illustrating a process 300 for deploying an application, in accordance with an embodiment of the invention. Process 300 may be performed in conjunction with process 400 of FIG. 4, as described herein. Process 300 may be employed by a server, such as server 202 of FIG. 2, or by another computing device. Process 300 may be employed in environment 100 of FIG. 1, or in another computing environment.

As used herein, a version of an application may refer to an application, or any subset of one or more components of application, in which any of the components may be a variation of a previous version of the component. A version may include components that are the same or a variation of a previous version. A revised version of a component may be deployed to an application, causing the entire application to be considered a new version. For illustrative purposes, components of an application are assigned a version number when they differ from a previous version, and an application is labeled by the version number of its most recently changed or added component. For example, when an application version 1 (V1) receives a component that is labeled version 2 (V2), the application is labeled as version 2 (V2). Similarly, an application may be labeled with a version number to indicate the current state of its static and dynamic components, even though a new component version has not been installed. For example, an application version 1 that has been executing for a time may be considered to be application version 1.1 and may have dynamic data that differs from the time of the most recent deployment. A version of an application may, but does not necessarily contain differences from a previous version. There exist many ways to label versions of an application or its components. The labels used herein are to assist in description, and are not intended to limit the invention. Further, a label of first version (V1) is used to identify and distinguish a version, and does not necessarily indicate that there have not been prior versions.

As shown in FIG. 3, after a start block, at block 302, a first version (V1) of an application is received. In one configuration, application V1 may be received from development system 204 of FIG. 2 or another application content provider. Application V1 may be received by deployment services component 206.

Process 300 may flow to block 304, where, in response to receiving V1 of the application, V1 of the application may be deployed. The actions of block 304 may include one or more of: moving or copying files into a designated location; setting keyword-value pairs in a registry; setting or modifying data in various system files, structures, or objects; translating or processing application components; invoking various system functions; or other deployment actions as part of an installation or configuration of the application.

Process 300 may flow to block 306, where a skeleton of the application V1 may be generated. As discussed herein, a skeleton may include data corresponding to each component that indicates a location of the component, a keyword, command, or other mechanism for accessing or modifying the component. The actions of block 306 may include analyzing the program code or other components of application V1 to retrieve component references and using the retrieved references to generate the skeleton.

Generating a skeleton may include examining the various components of the application, as well as links or references to other components. An application may include data, such as a skeleton, that is used by a skeleton generator. In one configuration, skeleton generator 218 may perform some or all of the actions of block 306.

Process 300 may flow to block 308, where a backup of the application V1 may be performed, based on the skeleton. In one configuration, backup/restore component 216 may perform some or all of the actions of block 308. In one configuration, the actions of block 308 may include copying the application components to repository 230. In one implementation, if a previous backup of the application has been performed, the backup of the application V1 may be an incremental backup or a complete backup.

In one embodiment, each of the actions of process 300 may be triggered and performed automatically, so that manual intervention is not required. In one implementation, in response to receipt of the application V1, deployment of the application may be automatically performed. In response to deployment of the application V1, generation of the skeleton and the backup of the application V1 may be automatically performed. In one embodiment, deployment of the application V1, as shown in block 304, may occur after or concurrently with performing the backup of application V1, as shown in block 308.

Figure 4:
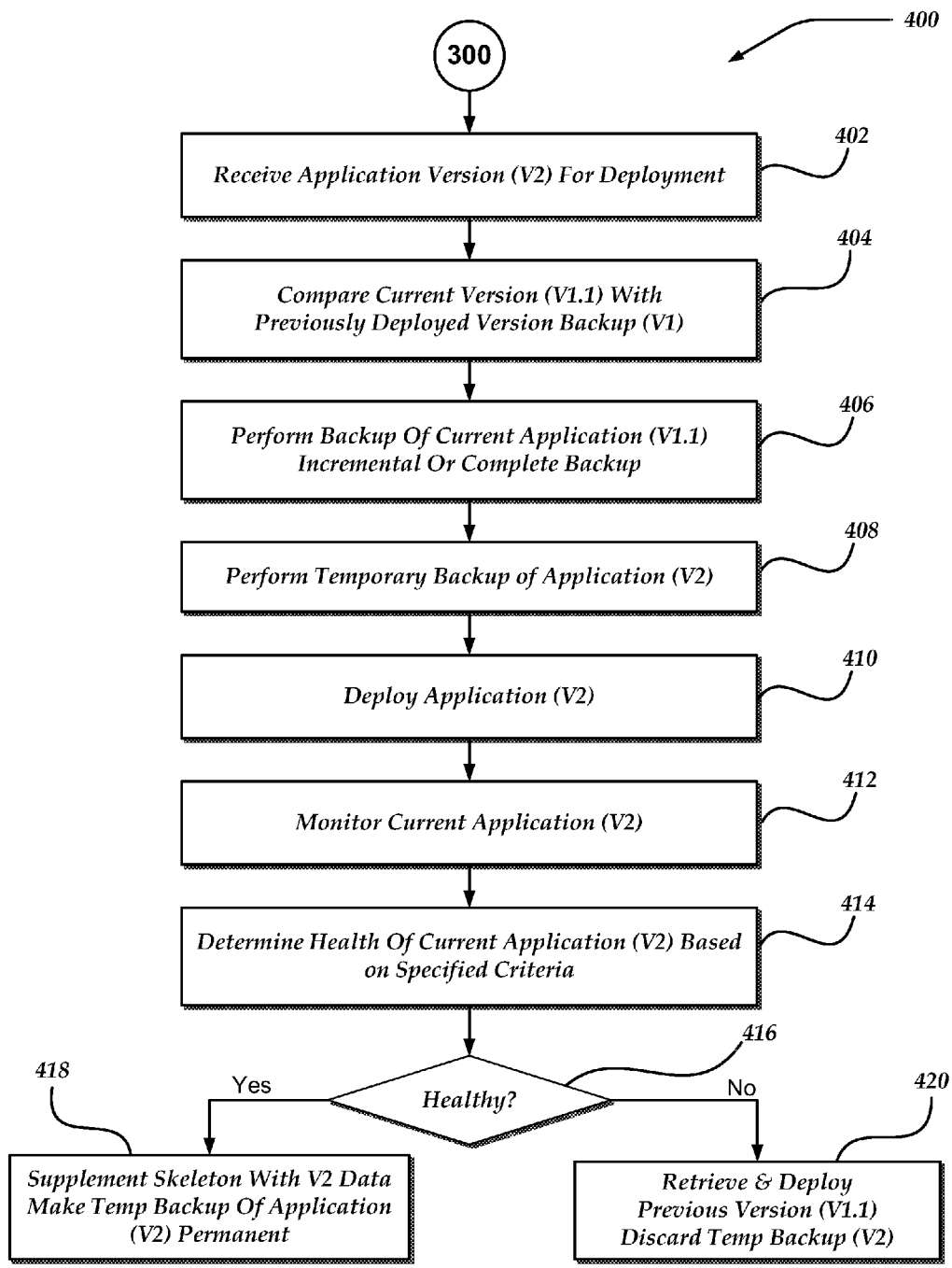
FIG. 4 is a flow diagram illustrating another process for deploying a network application, in accordance with an embodiment of the mechanisms described herein.

Process 300 may then flow into process 400 of FIG. 4. FIG. 4 is a flow diagram illustrating a process 400 for deploying an application, in accordance with an embodiment of the invention. Process 400 may be performed by server 202 of FIG. 2, or by another computing device. Process 400 may be employed in environment 100 of FIG. 1, or in another computing environment.

Process 400 may occur after process 300 has been performed. In one situation, process 400 may be performed after application V1 has executed for some period of time, which may be any time period from seconds to years.

As illustrated, after performing process 300, at block 402, an application V2, or a portion thereof, is received for deployment. As used herein, the term "application portion" refers to an entire application or any portion thereof. Application V2 may be referred to as "update application" V2, in that it is to be deployed to update a prior version. Similarly, the term "update application portion" refers to the portion of the application that is received for deployment. Update application portion V2 may be received from development system 204 of FIG. 2, from another development system, or from another content provider. Application portion V2 may be received by deployment services component 206.

Process 400 may flow to block 404 where, in response to receipt of application portion V2, the current version of the application may be compared with the previously backed up application version V1. The current version is the version that is currently installed. It is labeled as application V1.1 for illustrative purposes. Application V1.1 may be a version that differs from application V1 due to dynamic data that has been created or modified since deployment of application V1. In some environments, differences may include static content. The actions of block 404 may result in data descriptive of the differences between application V1 and application V1.1. In various implementations or configurations, the granularity of the difference data may vary. For example, in one configuration, the difference data may indicate files that differ; in another configuration, the difference data may indicate fields or portions within a file that differ. Similarly, the granularity of database difference specifications may differ. This may include specification of whether a database schema is to be compared, or whether the content of database fields is to be compared.

Process 400 may flow to block 406, where a backup of the current application V1.1 is performed. Depending on a configuration, the backup may be an incremental backup based on the determined differences, or it may be a complete backup. Thus, in some implementations, the comparison of block 404 may be skipped. In some configurations, the granularity of an incremental backup may differ from the granularity of the differences determined at block 404. In one implementation, actions of block 406 may include copying the application components to repository 230.

Process 400 may flow to block 408, where a temporary backup of application V2 may be performed. The backup is considered temporary because it is not yet known whether the application V2 is a successful version. However, if the version is considered successful, this backup may later be converted into a permanent backup version. It is to be noted that, though block 408 is illustrated prior to block 410, some or all of the actions of deploying the application V2 as described for block 410 may be performed prior to, or in conjunction with, performing the backup of block 408.

Process 400 may flow to block 410, where the application V2 is deployed. The deployment of application V2 may include any of the actions described above for the deployment of application V1 at block 304, though they are not necessarily the same. For example, the deployment of application V1 may include creating an entry in a structure, and the deployment of application V2 may include changing or deleting the same entry. The actions of block 410 may include employing the deployed application as a "live" application.

Process 400 may flow to block 412, where, in response to deploying application V2, monitoring of the current application (now V2) may be automatically performed. In one implementation, monitoring of the current application (V2) may be performed by health monitor 224. User-defined health monitor 226 may perform some or all of the monitoring tasks.

As described herein, monitoring the current application may include monitoring communications between the current application and remote devices. This may include examining status or other return values, such as HTTP status values, or status values of other network protocols. The actions of monitoring may include examining data other than communications with remote devices, such as logged data, records in a database, the creation or deletion of files, files with dynamic data, or other effects of the execution of application V2. In one implementation, the actions of monitoring may include performing one or more probing actions, such as sending a request or command to the application V2, and examining the result. In one implementation, monitoring may include timing behaviors or events, to determine whether the application is functioning within specified constraints. For example, one such behavior that might be timed is the amount of time between receiving a network request and sending a response.

The process may flow to block 414, where a determination is made of the health of the current application (V2), based on the actions of block 412 and specified criteria. The criteria may include a number or rate of errors or other type of status values, a maximum allowable time to perform certain actions, expected responses to requests by remote devices or from monitor probes, expected database values, file configurations, or the like.

The process may flow to decision block 416, where the process flow may be based on the determination of block 414, and specifically, whether the application is considered to be healthy. If the application is considered to be healthy, the process may flow to block 418. In one implementation, at block 418, a previously generated skeleton corresponding to the application may be supplemented by performing additional analysis, as described herein, of program code or other components of the application V2. Also at block 418, in response to determining that the application is healthy, the temporary backup of the application V2, as discussed at block 408, may be converted to a permanent backup. After the actions of block 418, the system may be in a state similar to the state prior to process 400, as described. Another application version (V3) may be received, and process 400 may be repeated with the backed up application V2, or a subsequent variation (V2.1), being the base application for the new application version V3.

If, at decision block 416, it is determined that the application is not healthy, the process may flow to block 420, where, in response to determining that the application is not healthy, an intervention may be performed. In one implementation, as part of the intervention, the previously backed up application version V1.1 may be automatically retrieved and deployed. The temporary backup of the application V2, as discussed at block 408, may be discarded. In one implementation, the intervention may include sending a status message to an administrator. This may be sent by email, text message, or any other communication mechanism. In one implementation, instead of automatically reverting to the backed up application version V1.1, a status message is sent and an administrator may manually elect to revert to a backed up application version.

In one embodiment, each of the actions, though not necessarily all of the actions, of process 400 may be automatically triggered and performed, so that manual intervention is not required. In one implementation, in response to receipt of the application V2, a backup of the current application V1.1 may be automatically performed. The deployment of application V2 may be automatically performed in response to receiving the application V2. Monitoring the current application V2 and determining the health of the current application may be automatically performed in response to deployment of the application V2. Retrieving and deploying the previous application V1.1 may be automatically performed in response to determining that the application V2 is not healthy, and a backup of the current application V2 may be performed in response to determining that the application is healthy.

It is to be noted that the health of an application does not necessarily indicate that the application is bad or the cause of a problem. In some configurations, a problem with other software or hardware on the server may be triggered by the application, resulting in a determination of unhealthy.

It will be understood that each block of the flowchart illustrations of FIGS. 3 and 4 and combinations of blocks in the flowchart illustrations, can be implemented by computer program instructions. These program instructions may be provided to a parallel processor to produce a machine, such that the instructions, which execute on the processor, create means for implementing the actions specified in the flowchart block or blocks. The computer program instructions may be executed by a parallel processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A computer-implemented method for updating a network application on a server, the network application having a first version that is currently installed, comprising:
   receiving an updated second version of at least a portion of the network application;
   in response to receiving the updated second version,
      automatically performing a backup of the first version of the network application that is currently installed on the server to generate a first version backup of the network application;
      subsequent to performing the backup of the first version of the network application, deploying and executing on the server the updated second version of the at least a portion of the network application in lieu of the first version;
      during execution of the updated second version, sending one or more network requests to the executed updated second version of the network application and determining whether one or more responses to the one or more network requests from the executed second version include error messages;
      in response to determining that the one or more responses from the executed second version include error messages, replacing the deployed second version with the first version of the network application by restoring the generated first version backup of the network application on the server; and
      in response to determining that the one or more responses from the executed second version do not include error messages, maintaining the second version of the network application on the server.

2. The method of claim 1, further comprising automatically determining a set of components of the first version of the network application, the set of components including static content and dynamic content, and wherein automatically performing the backup comprises automatically backing up the dynamic content based on the set of components.

3. The method of claim 1, further comprising automatically determining a set of dynamic components of the first version of the network application by extracting at least one database access command from the network application.

4. The method of claim 1, further comprising automatically determining a set of components of the first version of the network application based on a prior version of the network application; and automatically supplementing the set of components based on the updated second version of the network application.

5. The method of claim 1, wherein automatically performing the backup of the first version comprises retrieving and storing dynamic data associated with the first version of the network application.

6. The method of claim 1, further comprising allowing a user specify a granularity of at least one component of the network application, performing a comparison of the second version with the first version based on the granularity specification, and facilitating performance of the backup of the first version based on the granularity specification.

7. The method of claim 1, further comprising during execution of the deployed update version, analyzing the one or more error messages to determine a type or a rate of error messages, and determining whether the determined type is an acceptable type or the rate of error messages is below a threshold.

8. The method of claim 1, further comprising determining whether in response to an Internet request, a response from the executed updated second version includes an error message.

9. A computer-readable hardware storage medium having stored thereon computer program instructions for updating a network application, the program instructions executable by a processor to perform actions including:
   deploying and executing a first version of the network application on a server;
   automatically generating a list of static and dynamic components of the network application by analyzing the first version of the network application;
   receiving an updated second version of at least a portion of the network application;
   in response to receiving the updated second version of at least a portion of the network application:
      automatically performing a backup of the first version of the network application currently installed on the server to generate a first version backup of the network application, the first version backup of the network application including dynamic data of the network application;
      deploying the updated second version of the network application on the server;
   executing the deployed second version of the network application on the server in lieu of the first version;
      during execution of the updated second version, sending one or more network requests to the executed updated second version of the network application and determining whether one or more responses to the one or more network requests from the executed second version include error messages;
      in response to determining that the one or more responses from the executed second version include error messages, replacing the deployed second version with the first version of the network application by restoring the generated first version backup of the network application on the server; and
   in response to determining that the one or more responses from the executed second version do not include error messages, maintaining the second version of the network application on the server.

10. The computer-readable hardware storage medium of claim 9, wherein automatically performing the backup includes automatically backing up the dynamic components of the network application.

11. The computer-readable hardware storage medium of claim 9, wherein automatically performing backup of the first version of the network application includes extracting at least one data access command from the first version of the network application; and performing the backup of the first version by employing the data access command to retrieve the dynamic data.

12. The computer-readable hardware storage medium of claim 9, wherein the actions further includes automatically supplementing the list of the static and dynamic components based on the updated second version of the network application.

13. The computer-readable hardware storage medium of claim 9, wherein the action further includes analyzing the one or more responses from the second version to the one or more network requests based on at least one of a network protocol status value or an amount of time to send each of the one or more responses.

14. A computer system having a processor and a memory holding instructions that, when executed by the processor, cause the processor to perform a process comprising:
   executing a first version of a network application;
   during execution of the first version, receiving an updated second version of at least a portion of the network application;
   in response to receiving the updated second version,
      performing a backup of the first version of the network application that is currently executed by the processor to generate a backup file of the network application;
      subsequent to performing the backup of the first version of the network application, replacing the first version with the updated second version and executing the updated second version of the at least a portion of the network application in lieu of the first version;
   during execution of the updated second version, sending one or more network requests to the executed updated second version of the network application and determining whether one or more responses to the one or more network requests from the executed second version include error messages;
   in response to determining that the one or more responses from the executed second version include error messages, replacing the deployed second version with the first version of the network application by restoring the generated first version backup of the network application on the server; and
   in response to determining that the one or more responses from the executed second version do not include error messages, maintaining the second version of the network application on the server.

15. The computer system of claim 14, wherein the process performed by the processor further includes in response to receiving the updated second version, determining a set of components of the first version of the network application, the set of components including static content and dynamic content, and wherein performing the backup includes backing up the dynamic content based on the determined set of components.

16. The computer system of claim 15, wherein determining the set of components of the first version of the network application includes extracting at least one database access command from the network application.

17. The computer system of claim 15, wherein the process performed by the processor further includes supplementing the set of components based on the updated second version of the network application.

18. The computer system of claim 15, wherein performing the backup of the first version comprises retrieving and storing dynamic data associated with the first version of the network application.

19. The computer system of claim 15, wherein the process performed by the processor further includes allowing a user specify a granularity of at least one component of the network application, performing a comparison of the second version with the first version based on the granularity specification, and facilitating performance of the backup of the first version based on the granularity specification.

20. The computer system of claim 15, wherein the process performed by the processor further includes during execution of the deployed update version, analyzing the one or more error messages to determine a type or a rate of error messages, and determining whether the determined type is an acceptable type or the rate of error messages is below a threshold.

* * * * *